J. E. MEDLEY.
LAWN MOWER SHARPENER.
APPLICATION FILED SEPT. 30, 1916.

1,240,469.

Patented Sept. 18, 1917.
2 SHEETS—SHEET 1.

Witnesses
G. F. Williamson
H. L. Opsahl

Inventor
JOHN E. MEDLEY
By his Attorneys
Williamson Merchant

J. E. MEDLEY.
LAWN MOWER SHARPENER.
APPLICATION FILED SEPT. 30, 1916.

1,240,469.

Patented Sept. 18, 1917.
2 SHEETS—SHEET 2.

Witnesses
G. F. Williamson
H. L. Opsahl.

Inventor
JOHN E. MEDLEY
By his Attorneys
Williamson Merchant

UNITED STATES PATENT OFFICE.

JOHN E. MEDLEY, OF PORTLAND, OREGON, ASSIGNOR OF ONE-HALF TO WALTER B. SCHUETTE, OF MORRISTOWN, MINNESOTA.

LAWN-MOWER SHARPENER.

1,240,469.   Specification of Letters Patent.   Patented Sept. 18, 1917.

Application filed September 30, 1916.   Serial No. 123,021.

*To all whom it may concern:*

Be it known that I, JOHN E. MEDLEY, a citizen of the United States, residing at Portland, in the county of Multnomah and State of Oregon, have invented certain new and useful Improvements in Lawn-Mower Sharpeners; and I do hereby declare the following to be a full, clear, and exact description of the invention, such as will enable others skilled in the art to which it appertains to make and use the same.

My invention has for its object to provide a simple and highly efficient device for sharpening the blades of lawn mowers; and, to this end, it consists of the novel devices and combinations of devices hereinafter described and defined in the claims.

In the accompanying drawings, which illustrate the invention, like characters indicate like parts throughout the several views.

Referring to the drawings.

Figure 1:
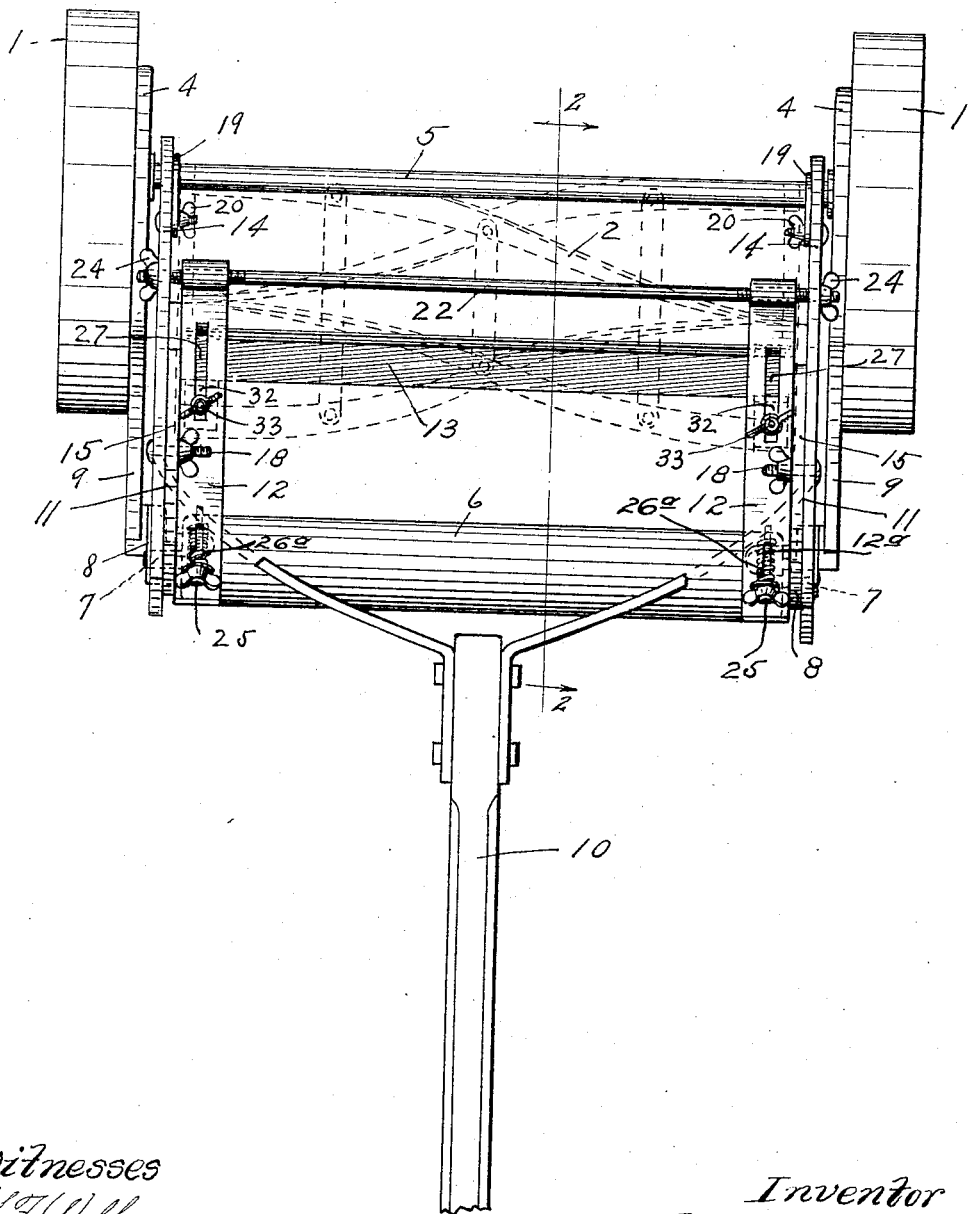
Figure 1 is a plan view of the lawn mower having the improved sharpener applied in working position thereon, some parts of the lawn mower being illustrated by means of broken lines.

Of the parts of the lawn mower illustrated, it is only necessary to note the traction wheels 1, spiral cutting blades 2, fixed cutting bar 3, non-rotary gear cases 4, transverse tie rod 5, which rigidly connects the two laterally spaced gear cases 4, rear supporting roller 6, having trunnions 7 journaled in adjustable bearings 8 on rear extensions 9 of the gear cases 4, and push bar or handle 10 pivoted to the gear cases 4. The parts thus far referred to are of standard construction and further description thereof is not thought necessary. The transverse tie rod 5 and trunnions 7 serve to support the improved blade sharpening device.

The blade sharpening device comprises three main elements or members, to wit: a frame 11, supporting arms 12, and a flat faced file 13.

Each side member of the frame 11 is made up of a pair of crossed flat bars 14 and 15, having in their lower ends V-shaped notches 16 and having in their upper crossed ends longitudinally extended slots 17, through which is extended a thumb-nut equipped clamping bolt 18. The notched ends of the bars 14 are arranged to straddle the transverse bar 5 and the notched ends of the bars 15 are arranged to straddle the trunnions 7, between the ends of the roller 6 and the bearings 8. The clamping bolts 18 rigidly connect each pair of bars 14 and 15 in different transverse and angular adjustments, with respect to each other. Hooks 19 are pivoted on nut-equipped bolts 20 mounted in longitudinal slots 21 formed in the bars 14 near their lower ends. These hooks 19 are arranged to engage the transverse bar 5 and hold the bars 14 against lifting movement therefrom, but with freedom for pivotal movement thereon.

The side members of the frame 11 are held against spreading movement at their upper ends by a tie rod 22, loosely extended through any alined pair of longitudinally spaced bores 23 in the bars 14 above the hooks 19 and has on its outer ends thumb nuts 24, by which the bars 14 may be adjusted toward each other. The lower ends of the side members of the frame 11 are held laterally spaced by the engagement of the bars 15 with the roller 6 and bearings 8.

The arms 12 are pivoted to the tie rod 22 with freedom for lateral adjustment thereon and extend rearwardly and downwardly therefrom, transversely of the cutting blades 2. The free ends of the arms 12 are adjustably connected to the bars 15 by bolts 25 passed through slots 12$^a$ in said arms and having screw-threaded engagement with angle brackets 26, pivoted to the lower end of the bars 15. Coiled springs 28 encircling the bolts 25, are arranged to be compressed between the brackets 26 and arms 12 and tend to lift said arms away from the cutting blades 2. Relatively light coiled springs 26$^a$ encircle the bolts 25 between the head thereof and the arms 12 and hold the file 13 on the cutting blades 2 with a slight yielding action. If desired, these springs 26$^a$ may be dispensed with and in which case, the bolt 25 will positively hold the file 13 on the cutting blades 2.

The file 13 extends transversely under the arms 12 and is secured thereto in position to act upon the blades 2 by clamps comprising pairs of opposing lips 29 and 30, arranged to enter grooves 31 formed in the longitudinal edges of said file. The lips 29 are fixed and are formed by cutting and pressing the same from the arms 12. The lips 30 are integrally formed with plates slidably mounted on the arms 12 and adjustably secured thereto by thumb nut-equipped clamping bolt 33 extended through bores in said plates and the slots 27 in the arms 12.

As is evident, by adjusting the bolts 18 and thumb nuts 24, the side members of the frame 11 and members 14 and 15 thereof may be adjusted to fit lawn mowers of different makes. In the adjustment of the bolts 20, the hooks 19 may be made to engage transverse rods of different diameters. With the notched ends of the bars 14 and 15 straddling the rod 5 and trunnion 7, and with the hooks 19 engaging the rod 5, the sharpening device is securely held in position on the lawn mower. The pivotal support for the arms 12 may be adjusted by shifting the tie rod 22 in the bores 23.

By adjusting the bolts 25, the arms 12 may be positioned to hold the file 13 at the proper angle to cut the desired bevel on the cutting edges of the blades 2. After the frame 11, arms 12, and hooks 19 are once properly adjusted to a particular lawn mower, they need not again be changed. Before the sharpening of the blades 2 is started, the bolts 25 are loosened to permit the springs 28 to lift the arms 12 and carry the file 13 out of contact with the blades 2. The said bolts 25 are then adjusted to move the arms 12 downward and longitudinally adjust the file 13, with respect to the cutting blades 2. With the file 13 properly adjusted for action on the cutting blades 2, said blades are rotated, either by pushing the lawn mower over the ground or lifting one of its traction wheels from the ground and spinning the same with a nail or tool (not shown) placed in a hole 34 in the lifted traction wheel. Under the rotation of the cutting blades 2, the same are successively moved transversely across the file 13 and evenly sharpened. In case the cutting blades 2 are very dull, the file 13 may be adjusted from time to time onto said blades by manipulating the bolts 25.

Figure 2:
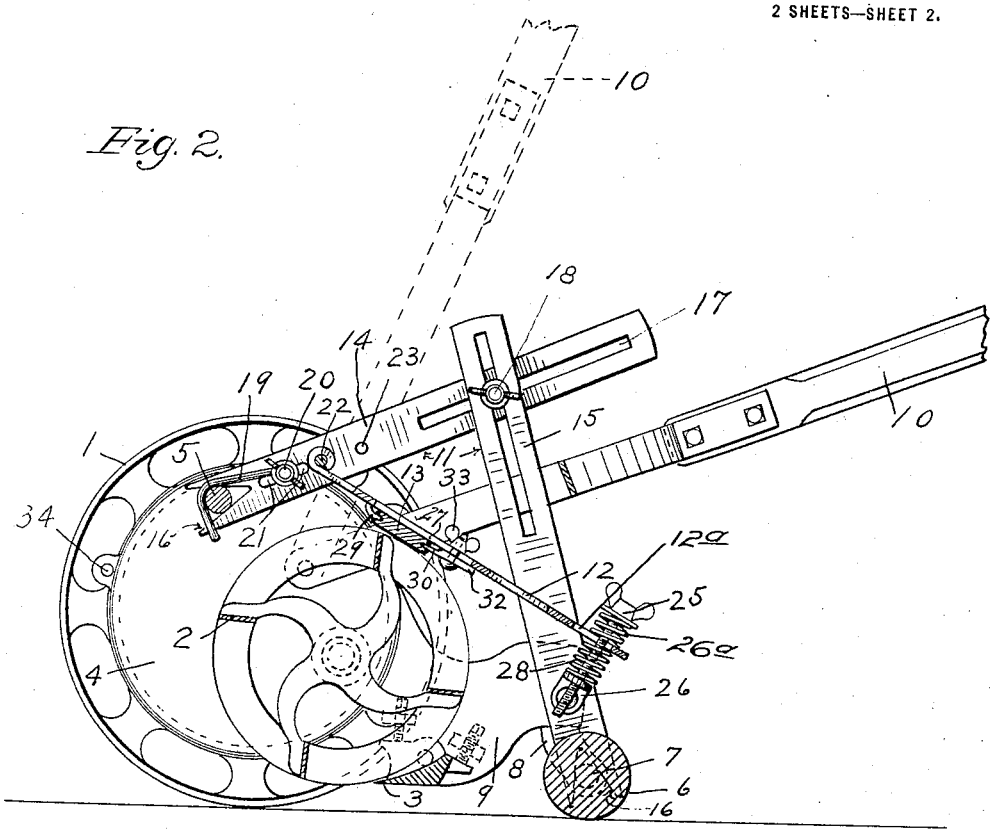
Fig. 2 is a transverse section taken on the line 2—2— of Fig. 1, some parts shown in different positions by means of broken lines;
Figure 3:
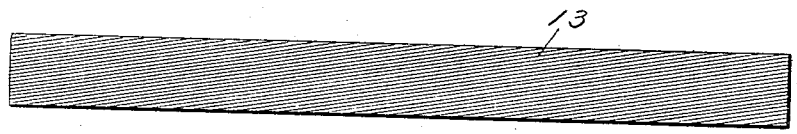
Fig. 3 is a plan view of the sharpening tool or file.
Figure 4:
Fig. 4 is an end elevation of the same.

By the clamps 29—30, the file 13 may be held with either side in an operative position, or a new file may be substituted for a worn out one, when desired. In positioning the sharpening device on a lawn mower, the handle 10 may be located either above or below the connections between the arms 14 and 15, as shown by full and broken lines in Fig. 2. When the cutting blades 2 are properly sharpened, the hooks 19 are turned into an inoperative position and the sharpening device lifted from the lawn mower.

To increase the efficiency of the file 13, for the purpose had in view, the same is "cut" at an acute angle to its longitudinal edges to give a long shearing action on the cutting blades 2.

What I claim is:—

1. A lawn mower sharpener comprising a frame having means for supporting the same on a lawn mower, a pair of arms pivoted to the frame and extending transversely of the cutting blades of the lawn mower, mechanical means for adjusting the free ends of the arms radially with respect to said cutting blades, and a sharpening tool carried by the arms for action on said cutting blades.

2. A lawn mower sharpener comprising a frame having means for supporting the same on a lawn mower, a pair of arms extending transversely of the cutting blades of the lawn mower, mechanical means adjustably securing both ends of the arms to the frame, and a sharpening tool carried by the arms for action on said cutting blades.

3. A lawn mower sharpener comprising a frame having means for supporting the same on a lawn mower, a pair of arms pivoted on the frame and extending transversely of the cutting blades of the lawn mower, a sharpening tool carried by the arms for action on said cutting blades, springs acting upon the arms and tending to lift the sharpening tool out of contact with said cutting blades, and means for adjusting the arms against the tension of the springs to carry the sharpening tool into contact with said cutting blades.

4. A lawn mower sharpener comprising a frame having means for supporting the same on a lawn mower, a pair of arms pivoted on the frame and extending transversely of the cutting blades of the lawn mower, a sharpening tool carried by the arms for action on said cutting blades, springs acting upon the arms and tending to lift the sharpening tool out of contact with said cutting blades, and screw bolts adjustably connecting the free ends of the arms to the frame with respect to said cutting blades.

5. A lawn mower sharpener comprising a frame having side members having means for supporting the same on a lawn mower, a tie rod connecting said side members, a pair of arms pivoted to the tie rod and extending transversely of the cutting blades of the lawn mower, a sharpening tool carried by the arms for action on said cutting blades, springs acting upon the arms and tending to lift the sharpening tool out of contact with said cutting blades, and means for adjusting the arms against the tension of the springs to carry the sharpening tool into contact with said cutting blades.

6. A lawn mower sharpener comprising a frame having adjustable side members having means for supporting the same on a lawn mower, a tie rod connecting said side members, a pair of arms pivoted on the tie rod and extended transversely of the cutting blades of the lawn mower, a sharpening tool carried by the arms for action on said cutting blades, springs acting upon the arms and tending to lift the sharpening tool out of contact with said cutting blades, and means for adjusting said arms against the tension of the springs to carry the sharpening tool into contact with said cutting blades.

7. A lawn mower sharpener comprising a frame having means for supporting the same on the fixed transverse rod of a lawn mower and the trunnion of the roller of said lawn mower, and a sharpening tool carried by the frame for action on the cutting blades of said lawn mower.

8. A lawn mower sharpener comprising a frame having side members made up of crossed bars with longitudinally extended slots and draw bolts extended through said slots and adjustably connecting the bars, said bars having notched outer ends arranged to straddle the trunnions of the roller of a lawn mower and the fixed transverse rod thereof, a tie rod connecting the side members of the frame, a pair of arms pivoted to the tie rod and extending transversely of the cutting blades of said lawn mower, and a sharpening tool carried by the arms for action on said cutting blades.

9. A lawn mower sharpener comprising a frame having side members made up of crossed bars with longitudinally extended slots and draw bolts extended through said slots and adjustably connecting the bars, said bars having notched outer ends arranged to straddle the trunnions of the roller of a lawn mower and the fixed transverse rod thereof, hooks on the frame and engageable with said rod, a tie rod adjustably connecting the side members of the frame, a pair of arms pivoted on the tie rod and extending transversely of the cutting blades of said lawn mower, and a sharpening tool carried by the arms for action on said cutting blades.

10. A lawn mower sharpener comprising a frame having side members made up of crossed bars with longitudinally extended slots and draw bolts extended through said slots and adjustably connecting the bars, said bars having notched lower ends arranged to straddle the trunnions of the roller of a lawn mower and the fixed transverse rod thereof, adjustable hooks on the frame and engageable with said rod, a tie rod connecting the side members of the frame, a pair of arms pivoted on the tie rod and extended transversely of the cutting blades of said lawn mower, and a sharpening tool carried by the arms for action on said cutting blades.

11. A lawn mower sharpener comprising a frame having side members made up of crossed bars adjustably connected for adaption to different sized lawn mowers, a pair of arms pivoted on the frame and extending transversely of the cutting blades of said lawn mower and having slots in their free ends, screw bolts extended through said slots and pivotally connected to said side members, and a sharpening tool carried by the frame and adapted to be carried into contact with said cutting blades by the adjustment of the screw bolts.

12. A lawn mower sharpener comprising a frame having side members made up of pairs of diverging bars adjustably connected at their upper ends and supported at both of their lower ends on a lawn mower, and a sharpening tool carried by said frame for action on said cutting blades.

In testimony whereof I affix my signature in presence of two witnesses.

JOHN E. MEDLEY.

Witnesses:
CLARA DEMAREST,
HARRY D. KILGORE.

Copies of this patent may be obtained for five cents each, by addressing the "Commissioner of Patents, Washington, D. C."